United States Patent [19]

Mallinson

[11] Patent Number: 4,516,533

[45] Date of Patent: May 14, 1985

[54] CONDUIT

[75] Inventor: Ronald I. Mallinson, Halifax, England

[73] Assignee: Mono-Flo Lister Limited, Halifax, England

[21] Appl. No.: 525,777

[22] Filed: Aug. 22, 1983

[30] Foreign Application Priority Data

Feb. 11, 1983 [GB] United Kingdom ............... 8303881

[51] Int. Cl.$^3$ .............................................. A01K 39/02
[52] U.S. Cl. ......................................... 119/72; 119/81
[58] Field of Search ................... 119/81, 75, 72.5, 72, 119/74; 285/DIG. 22, 419

[56] References Cited

U.S. PATENT DOCUMENTS 3,069,189 12/1962 Hollaender ................ 285/419 X
4,103,943 8/1978 Curtin .............................. 285/419
4,341,182 7/1982 Rustin et al. ..................... 119/75

FOREIGN PATENT DOCUMENTS 1065924 4/1967 United Kingdom .
2056246 3/1981 United Kingdom ............... 119/81

Primary Examiner—Hugh R. Chamblee

Attorney, Agent, or Firm—John C. Smith, Jr.

[57] ABSTRACT

An elongate pipe is connected to an elongate flange by a plurality of spaced clamps. The pipe is suspended from the elongate flange. The clamps and the conduit have a snap-in connection to clamp each other together and embrace the pipe between them.

A drinking water supply apparatus extends below the pipe and includes a nipple drinker which screw threadably engages the clamp and pipe to provide a passage for the water within the pipe through the nipple. A housing screw threadably engages the nipple and encloses an actuating pin depending from the nipple which pin, when raised, allows water to flow from the pipe. A striker extends into the housing, the striker having a water container on its lower end and being supported by a compression spring. When the water level in the container falls below a predetermined level, the spring raises the striker into engagement with the pin to raise the pin and allow water to flow from the pipe, through the nipple drinker and housing into the container. When the water level reaches or exceeds a predetermined level, the spring is depressed so that the striker no longer contacts the pin and water ceases to flow out of the pipe.

6 Claims, 1 Drawing Figure

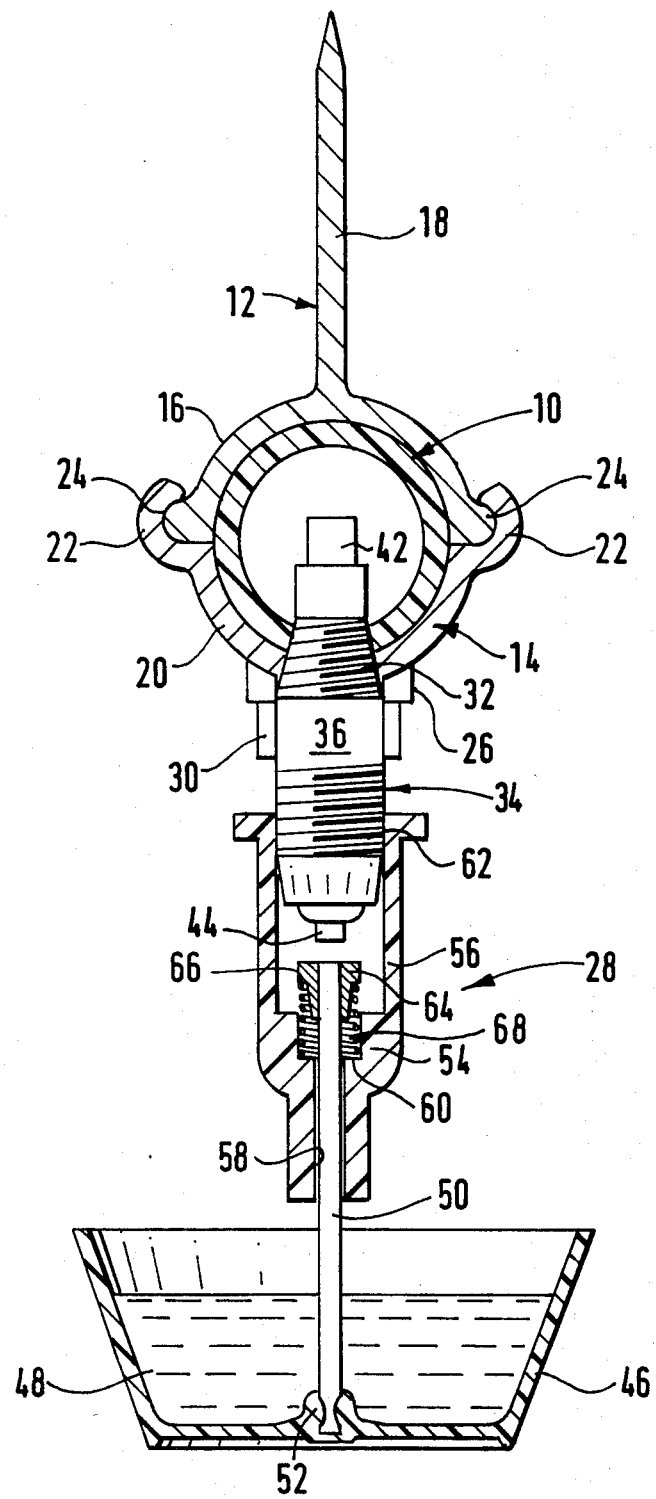

4,516,533

CONDUIT

Conduit is used for a variety of purposes, such as conveying liquids, gases or fluidised powders, and for protecting electrical cables. Some times conduit is used in situations where it is only supported at spaced-apart positions, and if the contents are relatively heavy (e.g. water), the conduit may sag.

A particular application of the invention is to water pipes for animal feeding installations such as those in broiler houses. In that case, the pipes are usually formed into a large trellis or frame so that the water can flow through the pipe to spaced-apart drinking outlets (generally drinking nipples) and the frame is suspended from parts of the building structure. Because the pipe lengths have to be joined end-to-end, to provide the frame, it is especially important to prevent sagging of the pipe in the vicinity of a joint because if the pipe does sag, the joint opens on the underside and permits water to leak from the pipe. It is also desirable to ensure that the drinking outlets are all at the same level and this is another reason why it is desirable to prevent sagging of the pipe. Whilst an animal water supply system has been cited, it will be appreciated that there are other arrangements in which conduit is employed and where it is at least desirable to prevent sagging of the conduit.

Water supply pipes for animal feeding systems have for some time been made of square cross-section extruded aluminium or plastics material. The square cross-section gives the pipe an appreciable moment of intertia about a horizontal axis and thus enables the pipe to resist vertical deflection due to its own weight and the applied load created by the water contained within it when the pipe is in use. However, the square cross-section pipe is more expensive than a circular cross-section pipe having the same cross-sectional area.

Recently, the problem has been met by extruded aluminium pipe of special cross-section having a circular main portion and a flange projecting radiallly outwards from it. If the pipe is used with the flange in a vertical plane, the resistance to sagging of the pipe is considerably increased from that of the circular portion by itself. Whilst this is a feasible solution to the problem, the pipe is still much more expensive than a plain circular cross-section pipe, and indeed is more expensive than the square cross-section plastics pipe.

According to this invention a conduit comprises a pipe portion and a separate flange adapted to be attached to the pipe portion so as to project radially outwards therefrom. When the flange is attached to the pipe portion, it provides the same strengthening effect as the flange of the special flanged extruded pipe previously mentioned. However, because the flange provided by the invention is made separately from the pipe portion, it can be made of relatively strong material (e.g. aluminium) at reasonable cost, whilst the pipe itself can be made of inexpensive material, and may for example take the form of a conventional circular cross-section plastics pipe. Moreover, the flange of the present invention can bridge the joint at the ends of two pipe lengths, thus providing a strengthening effect which could not be obtained from the special extruded pipe previously referred to.

According to a preferred feature of the invention, the conduit further comprises a clamp for securing the flange on the pipe portion, the clamp and the flange having a snap-in type connection. Preferably the flange has a saddle portion adapted to seat on the pipe portion and the clamp comprises a complementary saddle portion adapted to extend around the part of the pipe circumference not covered by the saddle portion of the flange; the longitudinal edges of the two saddle portions having snap-in interengagement to secure the flange and the clamp together and to embrace the pipe portion between them. The clamp may be made in plastics material such as rigid polyvinylchloride. Also the clamp may be relatively short, because a considerable length of the flange can be secured to the pipe by means of longitudinally spaced clamps.

According to another preferred feature of the invention, the clamp is bored to receive a drinking nipple. Preferably the bore is screw-threaded to receive a screw-threaded portion of the nipple drinker body.

The invention may be carried into practice in various ways, but one embodiment will now be described by way of example with reference to the accompanying drawing which is a cross-section through the pipe and flange in the region of a clamp including a drinking water apparatus.

Basically, the conduit comprises a pipe 10, a flange 12 and a clamp 14. The pipe 10 is a conventional extruded rigid P.V.C. pipe of circular cross-section, and may be made of relatively thin material, because as will hereinafter appear, apart from the essential function of containing the water which flows through the conduit, the pipe 10 only makes a minor contribution to the stiffness of the assembled conduit. Conveniently, the pipe 10 may be made in rigid polyvinylchloride.

The flange 12 is made as an extrusion in aluminium, or aluminium alloy, and by virtue of the extrusion method of manufacture, it is of constant cross-section throughout its length. The flange has a saddle portion 16 which seats snugly on the upper side of the pipe 10 (considering the pipe 10 as lying in a horizontal position) and as illustrated in the drawing, the saddle portion 16 subtends about 180° around the longitudinal axis of the pipe 10. A flange proper 18 extends radially outwards from the saddle portion 16, and is of approximately the same thickness as the saddle portion. Along its upper edge, the flange proper 18 is tapered. It is to be noted, that the flange proper is of considerable depth, and in the example illustrated, the depth of the flange proper is approximately equal to twice the diameter of the bore of the pipe 10. When the flange 12 is being used on a length of pipe, it will be normally of the same length as the pipe, so that it extends throughout the length of the pipe.

The clamp 14 is made as an injectionmoulding in rigid polyvinylchloride, and is of comparatively short length. For example, each clamp 14 may be approximately 25 millimeters in length. As shown, the clamp basically consists of a saddle portion 20 which is complementary to the saddle portion 16, in that it also subtends approximately 180° around the longitudinal axis of the pipe 10, whereby when the saddle portion 20 of the clamp 14 is located on the underside of the pipe 10, the two saddle portions 16 and 20 completely embrace the cross-section of the pipe 10.

At its longitudinal edges, the saddle portion 20 is formed with ears 22, which internally are adapted to seat on lugs 24 projecting from the longitudinal edges of the saddle portion 16 of the flange 12. The arrangement of the lugs 24 and the ears 22 is such that the ears 22 are a snap-on fitting over the lugs 24. Hence, when the conduit is being assembled, the flange 12 is fitted on to the top side of the pipe 10, and then clamps 14 are offered up to the underside of the pipe 10 at longitudinally spaced apart positions, and each clamp is snapped on to the lugs 24 of the flange 12. In this way, the clamps become secured to the flange 12, and because the pipe 10 is completely embraced by the two saddle portions at each position where a clamp is fitted, the flange 12 thereby becomes securely attached to the pipe 10.

Each of the clamps 14 is formed with a boss 26, which is bored to receive an attachment portion of a drinking water supply apparatus 28. It is necessary therefore, to ensure that a clamp 14 is fitted on to the pipe 10, at every position where a drinking water apparatus 28 is required. After the clamp 14 has been fitted to the pipe, the pipe itself must be bored, through the bore of the clamp, and then the bore formed in both the clamp 14 and the pipe 10 must be tapped to receive an externally screw-threaded portion 32 of the drinking water apparatus. It will be appreciated therefore, that the entire thickness of the saddle portion 20 of the clamp 14 plus the small additional thickness provided by the boss 26, is utilised to provide an additional thickness of material into which the drinking water apparatus 28 can be screwed. This of course provides a much firmer attachment for the drinking water apparatus than simply drilling and tapping a hole in the pipe 10, and in any case, since the pipe 10 is of circular cross-section, it would not be possible to provide a good seating for the hexagonal portion 30 of the nipple drinker body, as is provided by the underface of the boss 26.

When the conduit is in use, a stretch of the conduit between two suspension positions is subject to downward deflection due to the inherent weight of the conduit itself, and the applied load constituted by the water passing through the pipe 10. The moment of inertia of the pipe 10 about a horizontal plane is relatively small, but the moment of inertia of the combined pipe 10 and flange 12 about a horizontal plane is very much greater, because of the depth of the flange proper 18. Hence, the assembled conduit has a much greater rigidity against any tendency to deflect than the pipe 10 by itself. On the other hand, the pipe 10 can be of a very cheap construction, and the extruded aluminium flange 12 is not very expensive, especially since it is not of hollow construction. The clamps 14 can be produced very economically, as they are injection mouldings, and in any case they are only located at relatively widely spaced positions along the length of the pipe. Moreover, in addition to fulfilling the primary function of holding the flange 12 on the pipe, the clamps 14 fulfill the secondary function of providing a convenient mounting for the drinking water apparatus.

It frequently happens in the erection of a watering system for a broiler house for example, that lengths of the pipe have to be joined end-to-end. With the present invention, where there is such a joint, the flange 12 is carried across the joint (i.e. the ends of the flange 12 do not coincide with the ends of the pipe 10.) This assists greatly in ensuring that there is no opening of the joint between the ends of the pipe 10 due to downward deflection of the conduit.

It will be appreciated, that various modifications can be made in the invention described in the above example, without departing from the basic concept. Thus for example, instead of employing an extruded flange, the flange could be made from sheet metal—for example sheet steel. In that case, the flange could be made by bending the sheet steel to provide a saddle portion and a double thickness flange proper. Also, the saddle portion need not necessarily be semi-circular. It could for example constitute a "V" cross-section adapted to seat on the circular cross-section of the pipe 10 after the manner of a V-block. Furthermore, instead of the injection moulded clamps 14, preformed wire clamps could be employed for the purpose of securing the flange 12 on the to the pipe 10.

It should also be understood, that the invention could be used for a wide variety of purposes other than water supply for animals. Thus for example, if a conduit is required to carry electrical cables across the interior of a building, the conduit being suspended at spaced-apart positions, the invention could be adapted, so that a very thin and cheap pipe section could be employed. In that case, obviously the clamps which would be used to secure the flange to the pipe would not be required to provide drinking water apparatus, though they could still be bored, to provide convenient exit points for cables from the interior of the pipe.

The pipe 10 passes through a series of cages, and is filled with water from a mains supply (not shown). A single drinking water supply apparatus 28 is provided in each of the cages, and it will be appreciated therefore, that the conduit including the pipe 10 extend along the length of a row of cages and that a series of water supply apparatus of the type illustrated is connected into the conduit.

A nipple drinker 34 of known construction is secured to the conduit at the position where a water supply is required. Because the nipple drinker 34 is of aknown construction, it is not necessary to describe it in detail but it will suffice to say, that essentially it comprises a plastics body 36 having the screw-threaded portion 32 by means of which the nipple drinker 34 is secured in screw-threaded holes 38, 40 in the bottom wall of the pipe 10 and the boss 26 respectively. There is an inlet opening at the top of the body 36, but this is normally closed by the head 42 of a metal valve member. The valve member also has a part (not shown) projecting down into the body 36, and it rests in the position where its head 42 closes the inlet opening to the nipple drinker body by gravity. The nipple drinker also has an outlet at its lower end, and there is a downwardly depending actuating pin 44 extending through the outlet, part of the actuating pin projecting below the lower end of the body 36 as illustrated in the drawing. The internal arrangement of the nipple drinker 34 is such, that if the actuating pin 44 is raised, it lifts the valve member, so that the head 42 is raised from the inlet opening, and water from the interior of the pipe 10, is then able to flow through the nipple drinker and out through the outlet at the bottom end.

When a nipple drinker of this kind is used by itself, the projecting part of the actuating pin 44 is exposed, and whenever a bird pecks at the projecting part of the actuating pin, that causes the pin to rise, disloding the valve member from its seat, and allowing a small quantity of water to escape from the nipple drinker through the oulet at its lower end. One of the disadvantages of a nipple drinker when used by itself in this way, is that there is a tendency for water to be splashed around inside the cage, and some breeders regard it as a disadvantage that there is no visible water supply. On the other hand, there is a stage in the rearing of birds, when it is an advantage to be able to use the nipple drinker by itself.

A plastics cup-like water container 46 is associated with the nipple drinker 34 and, as shown in the drawing, will normally contain a quantity of water 48 accessible to birds through the open top of the container. A striker 40 in the form of a steel pin has its lower end moulded into a boss 52 of the container 46, so that the striker 50 is rigid with the container 46, and projects upwardly from the centre thereof. In fact, as is apparent in the drawing, the striker 50 projects a considerable distance above the top edge of the container 46. A hollow plastics housing 54 is also provided, and this housing has a bore 56 extending from its top end, and a smaller diameter bore 58 extending from its bottom end, so that an upwardly facing internal shoulder 60 is formed in the housing. The upper end of the bore 56 is internally screw-threaded, so that the housing 54 can be detachably engaged on a screw-threaded portion 62 of the nipple drinker body 14. As an alternative to a screw-threaded engagement on the nipple drinker body, the housing 54 could be made as a friction fit on the nipple drinker body, but the screwed connection is preferred. In any event, it is to be noted, that the housing 54 is readily detachable from the nipple drinker 34.

Part of the striker 50 passes upwardly through the small bore 58 in the lower end of the housing 54, and the clearance between the bore 58 and the striker 50 is such, that on the one hand, there is a passage for water through the bore 58—thus providing an oulet passage from the housing 54—whilst on the other hand, the bore 58 acts as a bearing which constrains the striker 50 to a substantially vertical axial motion relatively to the housing. This is significant, because since the cup or housing 46 is rigidly connected to the striker 50, the cup cannot be tilted, if it is struck by a bird, and this prevents accidental pouring of water out of the cup.

The upper end of the striker 50 extends into the large bore 56 of the housing 54, and a cap 64 is a press fit on the upper end of the striker. It will be observed, that the top end of the striker is aligned with the bottom of the actuating pin 44, but in any event, the cap 64 provides a relatively large head on the striker, so that whenever there is upward motion of the striker, part of it is certain to engage with the actuaing pin 44. The cap 64 also provides a downwardly facing shoulder 66 on the striker, and a light helical compression spring 68 is located in the housing 54, between the upwardly facing shoulder 60, and the shoulder 66 of the striker. Consequently, the striker and the cup 46 (together with any water contained in the cup) are suspending from the housing 54, and the weight of the suspended items, will act to compress the spring 68.

The arrangement of the parts is such, that if the container 46 is empty, the compression spring 68 will extend to such a length, that the head of the striker 50 is brought into engagement with the lower end of the actuating pin 44, so as to lift the latter, and open the nipple drinker. However, as soon as there is an adequate supply of water within the container 46, the weight of that water causes the container 46 to descent against the resilient load provided by the spring 68, thus disengaging the head of the striker 50 from the actuating pin 44, and allowing th nipple drinker valve to assume its normally closed condition. This is the condition illustrated in the drawing.

With an adequate supply of water in the container 46 as illustrated, the birds are able to drink from the container and because the level of the water is well below the top edge of the container, the risk of water being thrown out of the container by the birds is minimised. However, as the level of water in the container falls, the spring 68 is allowed to expand, until a threshold position is arrived at, where the head of the striker lifts the valve actuating pin 44 sufficiently to allow water to flow through the nipple drinker, and then through the housing 54, into the container 46. Again, when the level of water rises to an adequate extent, this has the effect of lowering the head of the striker away from the actuating pin 44, and so closing the nipple drinker valve. In practice of course, the arrangement provides a relatively close control over the level of water in the container 46, within the limits af any hysteresis effect of the mechanism.

If it is desired to operate with the nipple drinker by itself, it is only necessary to unscrew the housing 54 from the nipple drinker, and then the housing, with the cup and striker, which together form a detachable unit, is removed, allowing the birds access to the actuating pin 44 of the nipple drinker.

What I claim is:

1. A drinking supply arrangement comprising an elongated conduit, adapted to be suspended at a plurality of spaced locations therealong, and a plurality of drinking apparatus extending downwardly at spaced locations from said elongated conduit; said elongated conduit including a pipe portion and a flange portion, said flange portion extending along substantially the complete length of said pipe portion and including a flange and a connecting portion; means for securing said connecting portion to said pipe portion at a plurality of spaced locations along the length of said pipe portion, whereby said pipe portion is suspended from said flange portion and said flange projects radially upwardly from said pipe portion, and for suspending each of said drinking apparatus from said conduit and connecting each of said drinking apparatus for communication with the interior of said pipe portion.

2. A drinking apparatus arrangement according to claim 1 in which said flange is tapered towards its uppermost edge.

3. A drinking supply arrangement according to claim 1 wherein said securing means comprises a plurality of spaced clamps connecting said flange portion to said pipe portion, each of said clamps and said flange portion engaging one another by a snap-in connection.

4. A drinking supply arrangement according to claim 3 in which said flange portion includes a saddle portion seated on and extending about a portion of the circumference of said pipe portion and each of said clamps includes a complementary saddle portion extending around the part of the pipe circumference not covered by the saddle portion of said flange, longitudinally extending regions of the two saddle portions forming a snap-in connection to secure said flange and said clamp together and embrace said pipe portion between them.

5. A drinking supply arrangement according to claim 4 wherein each of said drinking apparatus comprises a drinking nipple connected to the inside of said pipe portion and extending through each of said clamps.

6. A drinking supply arrangement according to claim 1 wherein each of said drinking apparatus comprises a nipple drinker, said nipple drinker including a body, a valve and an actuating pin, said actuating pin depending downwardly below said valve and being axially movable and arranged so that it opens said valve when moved upwardly to allow water to flow through said nipple drinker; said drinking apparatus further including a housing, said housing being releasably attached to said nipple drinker and enclosing said portion of said pin depending downwardly below said valve and enclosing said nipple drinker water outlet, said housing having an upwardly facing shoulder and a water outlet passage; said drinking apparatus also including an open-topped water container, said container being positioned to catch water flowing out of said housing; said drinking apparatus including a compression spring; said striker being secured to said container and extending upwardly therefrom into said housing, said striker being aligned with said pin of said nipple drinker, and said compression spring being located betwen the underside of a shoulder on said striker and the shoulder in said housing whereby said striker and said water container are suspended from said nipple drinker; the drinking apparatus providing that, when the quantity of water in the container falls below a predetermined amount, said striker engages with said actuating pin and causes said pin to open said valve to allow water to flow through said housing into said container, but when the quantity of water in said container attains or exceeds a predetermined amount, said striker disengages from said actuating pin and allows said valve to close.

* * * * *